July 16, 1940.  J. W. DAEHLER  2,208,155
LAMP
Filed March 30, 1936
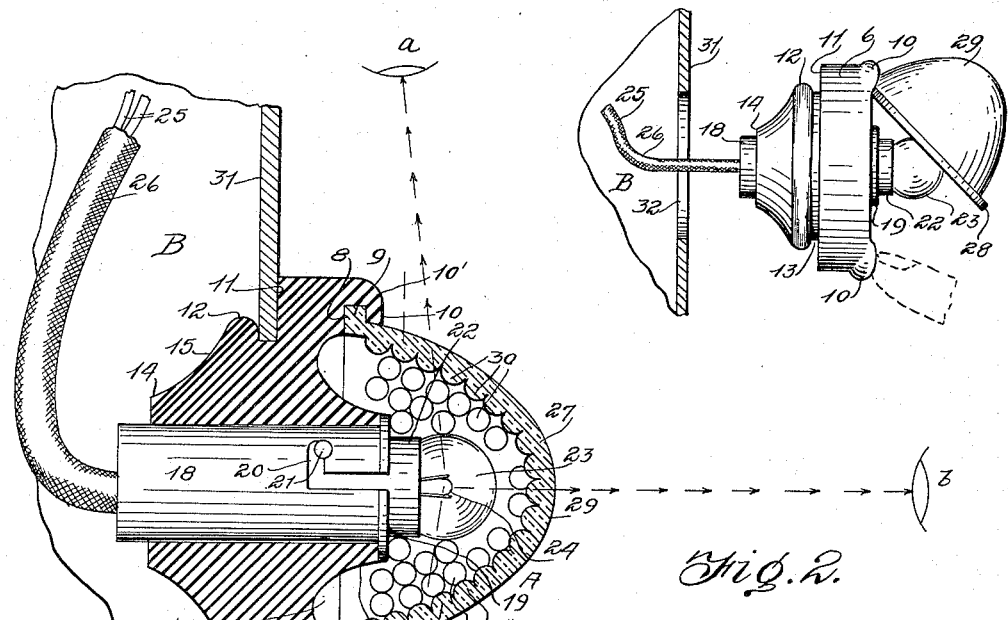
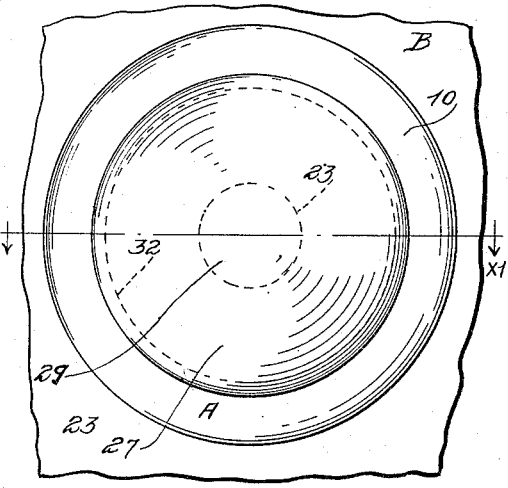
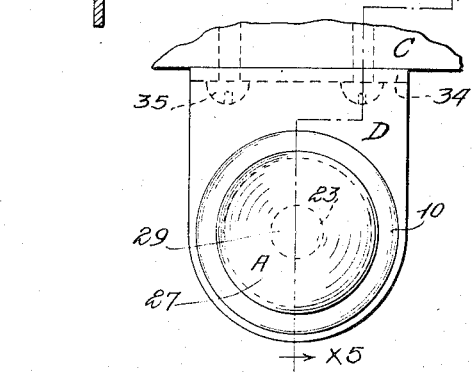
Inventor
JOHN W. DAEHLER,
Alfred H. Daehler
By
Attorney Patented July 16, 1940

2,208,155

UNITED STATES PATENT OFFICE 2,208,155

LAMP

John W. Daehler, Los Angeles, Calif.

Application March 30, 1936, Serial No. 71,642

3 Claims. (Cl. 240—7.1)

This invention relates to lamps, and more particularly to vehicle lamps adapted to withstand shocks, jars and the vibration incident to their use upon vehicles, moving machinery and the like, and in such positions where lamps are apt to be subjected to rough usage tending to extinguish the light furnished thereby or otherwise injure the lamp or parts thereof.

This application is for an improvement in the device shown in a co-pending application filed by me July 11, 1934, Serial No. 735,623, for Lamps, and the present invention relates particularly to lamps comprising a body of resilient material, such for instance as India rubber or like material, capable of being temporarily deformed under pressure or the impact of collisions and of automatically returning to original form after such deformation, and further comprising a source of light such as an electric lamp globe mounted upon the resilient body and projecting its rays laterally of the body as well as longitudinally thereof, and a preferably ovoid lens fitted to the body over the outwardly disposed electric lamp globe.

A particular object of the invention is to provide a vehicle lamp such as is required by statute in many communities and is generally known as a side light or a "clearance light" and the rays of which must be visible from the front of the vehicle, from the rear of the same, and particularly throughout the arc lying horizontally between these points of view. To this end the lamp globe and its filament are preferably placed well outwardly of the body which is adapted for support at the side of a vehicle. In order to render the filament highly visible from any of the aforementioned view points, the preferably ovoid projecting lens which is formed of suitably colored glass is preferably formed either internally or exteriorly with light refracting elements or lens projections which intercept and refract rays from the electric filament throughout the wide angle of ray projection. In this sense the lamp may be considered as a wide angle lamp.

The resilient body is preferably formed with a seat for a base flange which is provided upon the lens and outwardly of this seat a lens-retaining lip is formed upon the body. A further reason for providing a projecting lens is that the lens form is such that it may be gripped between the fingers and thumb of the one hand and removed from the body upon distorting the lens-retaining lip with a finger or fingers of the other hand, thus obviating the necessity of any tools for purposes of lamp or lens replacement. An additional advantage resulting from the specific form shown is that only an aperture in the side of a vehicle such as an omnibus, motor truck, trailer or like vehicle is required for mounting the lamp, provided that there is a suitable vehicle-plate at the place in which a clearance light is required; with a suitably cut circular opening the lamp may be pressed into place into the vehicle side and readily removed by means of the fingers and all without the employment of any tools. When no suitable vehicle plate exists at the place of lamp attachment I preferably provide an apertured bracket which may be formed of a strip of flexible or rigid material. When this strip is formed of suitably vulcanized rubber to give the necessary resiliency to the strip, or of any suitable substitute material, an additional shock-proof feature is provided, as in case of collision or severe impact, as with another vehicle, the strip will yield as well as the lamp body, and all parts will be automatically restored to their normal positions and the lamp will ordinarily not be extinguished.

With the above and other objects in view as will be hereinafter apparent, the invention consists in general of certain novel details of construction and combinations of parts hereinafter fully described, illustrated in the accompanying drawing and specifically claimed.

In the drawing: Figure 1 is a fragmentary horizontal central sectional view showing a lamp constructed and organized in accordance with the invention, the same being illustrated as mounted in a position of service as a side light in a vehicle body; Figure 2 is a face view of the lamp shown in Figure 1, the side of the vehicle being fragmentarily shown; Figure 3 is an edge view of the lamp showing how the same may be removed from the vehicle and how the resilient body lip may be distorted to remove the lens and projecting globe; Figure 4 is a face view of the lamp showing the same as mounted upon a vehicle by means of its bracket; and Figure 5 is a central vertical sectional view taken on the line x5—x5, Figure 4.

The parts in the several figures are designated by like reference characters.

Referring with particularity to the drawing, in the embodiment of the invention therein shown in Figures 1, 2 and 3, A designates, generally, a lamp or clearance light, and B a motor vehicle such as an omnibus or other vehicle requiring a side light having a wide angle of ray projection. The lamp A is shown as comprising a rubber body having a cylindrical flange 6 adapted to be seated against the apertured vehicle wall, the lamp body being centrally apertured at 7 to receive a lamp socket. A lens seat is formed in the body at 8 and an annular channel is formed therein at 9 between the seat 8 and a flexible retaining lip 10. The body is preferably formed with a rounded yielding shoulder portion at 10' to facilitate the flexing of the lip. The flange 6 is shown as seated against the vehicle wall at 11 and a second flange is shown at 12, the flanges 6 and 12 thus forming a peripheral channel 13 between them. Between the reduced rearward portion 14 and the flange 12, the body is preferably suitably curved as at 15, the tapered formation at 15 facilitating insertion of the lamp in the wall aperture or bracket. A central boss 16 is formed by providing a channel or rearwardly relieved portion at 17. A suitably formed lamp socket 18 having a lateral flange 19 and a bayonet slot 20 is pressed into the central aperture 7. The pin 21 of a lamp base 22 is shown as inserted in the slot 20. The lamp globe is shown at 23 as housing the electric filament or source of light 24. This filament 24 is shown as positioned far outwardly of the body of the lamp in order that the light rays therefrom may be seen from the points a, b and c where the eyes of observers are indicated. As the flange 19 of the socket lies outwardly beyond the face of the body and on the broken line d the light rays from the filament or globe emanating from a source still further outward sweep through a horizontal arc of more than 180 degrees, so rendering the lamp visible from all required points and by the use of a single suitably formed lens. One or more circuit wires at 25 may be made into a flexible insulated cable 26 fed from any suitable electrical energy supply. A semi-ovoidal projecting lens is shown at 27; this lens may terminate in a blunt point or be otherwise suitably formed as at 29 and has a laterally projecting base flange at 28 by means of which it is retained upon its seat by the flexible retaining lip 10. This lip is shown as flexed in Figure 3 as the lens is being removed by the fingers. The lamp is also here shown as removed from its normal position in the aperture 32 of the vehicle wall 31. The lens shown has projection 30 on its inside face and completely houses the globe.

In the form of the invention shown in Figures 4 and 5, the lamp structure remains the same as that just described, but a bracket 33 of flexible or other material having a supporting portion 34 angularly arranged therewith constitutes the lamp support. The lamp is attached to the vehicle member C by means of bolts or screws 35. The bracket may be apertured at 36 for assembly with the lamp. It will be seen from the drawings that the lamp socket 18 so fits in the body as to close the opening therein and the lens closes the front of the body. Thereby the interior is sealed against rain and dust.

I do not desire to be understood as limiting the invention to the specific details of construction shown or to the specific materials described, but reserve the right to vary the same in practicing the invention, and all without departing from the spirit of the invention or the terms of the following claims.

Having thus disclosed my invention, I claim and desire to secure by Letters Patent:

1. In a courtesy lamp for automobiles, a base of resilient rubber-like material adapted to fit in an aperture in a plate, said base including a tapered rear portion wider at its forward end than the aperture and smaller at its rear end than the aperture, said base having a front portion wider than the forward end of the rear portion, a groove being provided around the body between the rear and front portions to receive the edge of the plate surrounding its aperture; said base having a bore extending longitudinally of its center and provided with a forwardly extending boss centrally of the forward portion, said base having an internally grooved peripheral flange surrounding said boss, the groove of the flange being adapted to support the rim of a lens, a lamp socket seated in said bore and having a peripheral flange at its forward end seated on the forward face of said boss.

2. In a courtesy lamp for automobiles, a base of resilient rubber-like material adapted to fit in an aperture in a plate, said base including a tapered rear portion wider at its forward end than the aperture and smaller at its rear end than the aperture, said base having a front portion wider than the forward end of the rear portion, a groove being provided around the body between the rear and front portions to receive the edge of the plate surrounding its aperture; said base having a bore extending longitudinally of its center and provided with a forwardly extending boss centrally of the forward portion, said base having an internally grooved peripheral flange surrounding said boss, a semi-ovoidal lens provided with a peripheral flange removably seated in the last mentioned groove, a lamp socket seated in said bore and having a peripheral flange at its forward end seated on the forward face of said boss, and a lamp held in said socket and having a filament positioned in advance of the plane of the peripheral flange whereby the lamp may be seen through the lens over a spherical segment of over 180°.

3. A vehicle clearance light of the character disclosed comprising a unitary base of rubber-like material adapted to fit an aperture in a plate, said base including a tapered rear portion wider at its forward end than the aperture, said base having a front portion wider than the forward end of the rear portion, a groove being provided around the body between the rear and the front portions to receive the edge of the plate surrounding its aperture; said base having an internally grooved peripheral flange, said body having a central boss and a rearwardly extending recess surrounding said boss and lying behind the plane of the innermost portion of the lens, said boss having a central axially extending bore, a lamp socket seated in said bore, and an electric lamp mounted in said socket.

JOHN W. DAEHLER.